(12) United States Patent
Rowe

(10) Patent No.: US 7,396,988 B1
(45) Date of Patent: Jul. 8, 2008

(54) METHOD AND APPARATUS FOR MUSIC COMPOSITION

(76) Inventor: John Pasco Rowe, 903 Bluffview, McKinney, TX (US) 75071

( * ) Notice: Subject to any disclaimer, the term of this patent is extended or adjusted under 35 U.S.C. 154(b) by 0 days.

(21) Appl. No.: 11/546,271

(22) Filed: Oct. 11, 2006

Related U.S. Application Data

(60) Provisional application No. 60/775,400, filed on Feb. 21, 2006.

(51) Int. Cl.
*G09B 15/02* (2006.01)

(52) U.S. Cl. .................................................... 84/476
(58) Field of Classification Search .............. 84/470 R, 84/476, 477 R, 478, 479 R
See application file for complete search history.

(56) References Cited

U.S. PATENT DOCUMENTS 5,496,179 A * 3/1996 Hoffman .................... 434/433
5,949,010 A * 9/1999 Hacker ........................ 84/476

\* cited by examiner

*Primary Examiner*—Kimberly R Lockett

(57) ABSTRACT

A music composition method and apparatus is provided and consists of a plurality of small playing cubes each having a color-coded musical chord with a number to indicate the position of the chord within the matching color-coded musical key of a separate, larger cube indicated on each side thereof. A color-coded device is provided to guide the placement of playing cubes into sequences of chord progressions thereon after the playing cubes are cast upon a flat surface. A player can form multiple chord progressions from the chords on the top sides of the cast playing cubes and play the cast sequence of chords on their instrument thereby learning the relationship between the chords belonging to a musical key.

3 Claims, 3 Drawing Sheets

US 7,396,988 B1

METHOD AND APPARATUS FOR MUSIC COMPOSITION

CROSS-REFERENCE TO RELATED APPLICATIONS

This invention is based on provisional patent application Ser. No. U.S. 60/775,400 filed on Feb. 21, 2006.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not applicable

BACKGROUND OF THE INVENTION

The instant invention relates generally to game and more specifically it relates to a music composition method which provides a plurality of playing cubes having color-coded indicia thereon for the purpose of communicating musical concepts (namely the structure and relationship between the musical chords belonging to a musical key) and are used to compose cast sequences of chord progressions with the aid of a color-coded apparatus that coordinates the placement of said playing cubes.

BRIEF SUMMARY OF THE INVENTION

A primary object of the present invention is to provide a music composition method and apparatus that will overcome the shortcomings of the prior art devices.

Another object is to provide a music composition method and apparatus utilizing a plurality of playing cubes with color-coded indicia thereon for the purpose of creating cast sequences of chord progressions so as to promote the enrichment of a player's musical knowledge and encourage the player to be alert when playing the game.

An additional object is to provide a music composition method that includes a color-coded apparatus, called a 'RhythmGuide', so as to enhance the equipment used in the game.

A further object is to provide a music composition method and apparatus that is simple and easy to use.

A still further object is to provide a music composition method and apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DETAILED DESCRIPTION OF THE INVENTION

Figure 1:
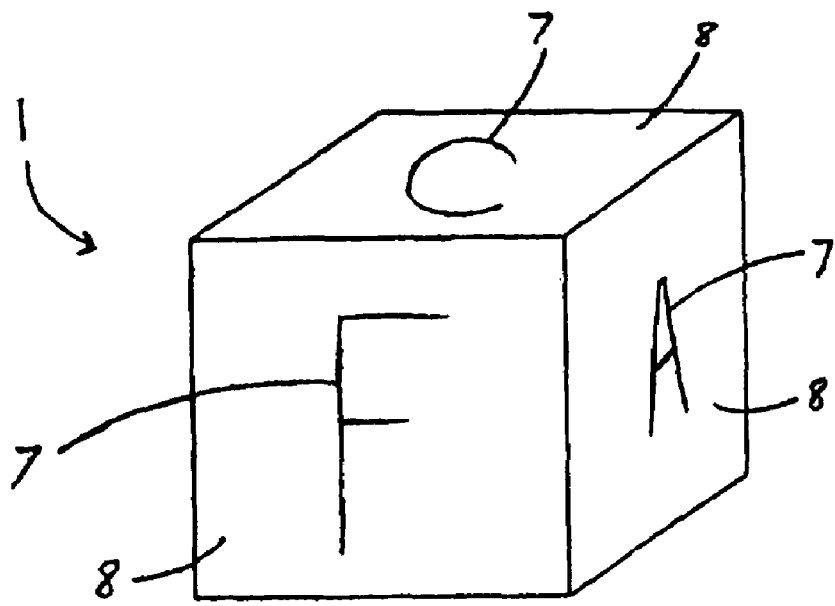
FIG. 1 is a perspective view of the large playing cube, called the 'KeyCube', with color-coded indicia thereon used to communicate musical concepts (namely the relationship between the name of a musical key and the chords belonging to said key) and the associated music composition method thereof.

Turning now descriptively to the drawings, in which similar reference characters denote similar elements throughout the several views the figures illustrate a music composition method consisting of one large playing cube 1 with color-coded letter indicia 7 of which is shown in FIG. 1. The color-coded letter indicia 7 of which is shown on the large playing cube 1 indicates primarily the name of a musical key and second the name of a musical chord within said key, and for the purpose of this invention the letter indicia 7 is associated with the color of said letter 7. One of six, uniquely colored musical keys 7 appears on each side 8 of the large playing cube 1. The large playing cube 1 is made up of six different sides 8, of which one side 8 has purple indicia 7 of the letter "F" to indicate the key of F Major and the F chord. One side 8 of the cube 1 has orange indicia 7 of the letter "D" to indicate the key of D Major and the D chord. One side 8 of the cube 1 has green indicia 7 of the letter "G" to indicate the key of G Major and the G chord. One side 8 of the cube 1 has crimson indicia 7 of the letter "C" to indicate the key of C Major and the C chord. One side 8 of the cube 1 has azure indicia 7 of the letter "A" to indicate the key of A Major and the A chord. One side 8 of the cube 1 has yellow indicia 7 of the letter "E" to indicate the key of E Major and the E chord.

In labeling the large playing cube 1 the side 8 of the cube 1 facing the viewer is the first key indicia 7 of the cube 1. This side 8 of the cube 1 is labeled "F" with purple indicia. Then turn the cube 1 upward for the next face of the cube labeled "D" for the key of "D" indicated by orange indicia. The second upward turn for the key of "G" indicated by green indicia. The third upward turn for the key of "C" indicated by crimson indicia. For the keys of "E & A" let the side 8 of the cube 1 with the key of F face in front. Label the key indicia 7 of the unmarked, right side 8 of the cube 1 with an azure "A" to indicate the key of "A". Label the key indicia 7 of the unmarked, left side 8 of the cube 1 with a yellow "E" to indicate the key of "E".

Figure 2:
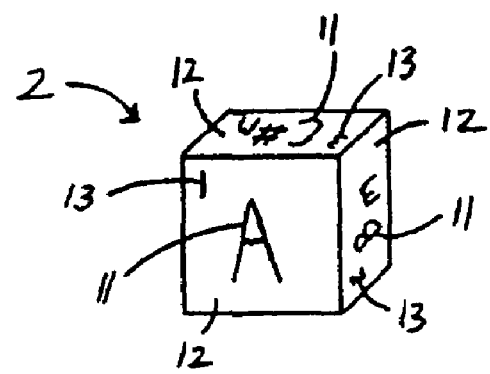
FIG. 2 is a perspective view of one of the small playing cubes, collectively called the 'ChordDice', with color-coded indicia thereon used to communicate musical concepts (namely the structure and relationship between the chords belonging to a musical key) and the associated music composition method thereof.

Twenty-four small playing cubes 2 of which one cube 2 is shown in FIG. 2 having color-coded, letter indicia 11 which represents the name of a musical chord 11 and having corresponding color-coded indicia 13 superscripted to the left of said chord 11. The superscripted indicia 13 of which is shown in FIG. 2 represents the numerical position belonging to the adjacent chord 11 within the matching color-coded, musical key 7 labeled on the large playing cube 1. The color of the chord indicia 11 matches the color of the superscripted, number indicia 13 on each side of the small playing cube 2. The color of the indicia (11)(13) on all six sides 12 of the small playing cube 2 matches one of six indicia colors 7 on the large playing cube 1. Of these twenty-four small playing cubes 2, the color of the indicia (11)(13) is purple on all six sides 12 of four cubes 2. Of these twenty-four small playing cubes 2, the color of the indicia (11)(13) is crimson on all six sides 12 of four cubes 2. Of these twenty-four small playing cubes 2, the color of the indicia (11)(13) is azure on all six sides 12 of four cubes 2. Of these twenty-four small playing cubes 2, the color of the indicia (11)(13) is green on all six sides 12 of four cubes 2. Of these twenty-four small playing cubes 2, the color of the indicia (11)(13) is yellow on all six sides 12 of four cubes 2. Of these twenty-four small playing cubes 2, the color of the indicia (11)(13) is orange on all six sides 12 of four cubes 2.

| LIST OF THE 6 GROUPINGS OF MUSICAL CHORDS | | | | | | | |
|---|---|---|---|---|---|---|---|
| Guide Group Number | Number Of Cubes | Chord Position/Chords (Distribution) | | | | | |
| | | 1 | 4 | 6 | 3 | 2 | 5 |
| (1) crimson | 4 | C | F | Am | Em | Dm | G |
| (2) green | 4 | G | C | Em | Bm | Am | D |
| (3) orange | 4 | D | G | Bm | F#m | Em | A |
| (4) azure | 4 | A | D | F#m | C#m | Bm | E |
| (5) yellow | 4 | E | A | C#m | G#m | F#m | B |
| (6) purple | 4 | F | Bb | Dm | Am | Gm | C |

In labeling the chord indicia 11 and superscripted indicia 13 of the small playing cube 2 the side 12 of the cube 2 facing the viewer is the first chord letter 11 of the Group. Example, in Guide Group No. 6: All chord indicia 11 and all superscripted indicia 13 on the sides 12 of the small playing cube 2 are purple. "F" is the first chord indicia 11 and "1" is the adjacent, superscripted indicia 13 situated to the left of the "F" chord indicia 11 to indicate that the "F" chord is the first chord within the key of F Major. Then turn the cube 2 upward for the next face of the cube 2 for the chord indicia 11 labeled "Bb" (read "B flat") and adjacent, superscripted indicia 13 labeled "4" to indicate that "Bb" is the fourth chord within the key of F Major. Then turn the cube 2 a second upward turn for the chord indicia 11 labeled "Dm" (read "D minor") and adjacent, superscripted indicia 13 labeled "6" to indicate that "Dm" is the sixth chord within the key of F Major. Then turn the cube 2 a third upward turn for the chord indicia 11 labeled "Am" (read "A minor") and adjacent, superscripted indicia 13 labeled "3" to indicate that "Am" is the third chord within the key of F Major. For chords "Gm & C" let the side 12 of the cube 2 with the F chord face in front. The unmarked, right side 12 of the cube 2 is for the chord indicia 11 labeled "Gm" (read "G minor") and adjacent, superscripted indicia 13 labeled "2" to indicate that "Gm" is the second chord within the key of F Major. The unmarked, left side 12 of the cube 2 is for the chord indicia 11 labeled "C" and adjacent, superscripted indicia 13 labeled "5" to indicate that "C" is the fifth chord within the key of F Major. A total of four cubes 2 will be labeled according to this pattern described for Guide Group No. 6.

Figure 3A:
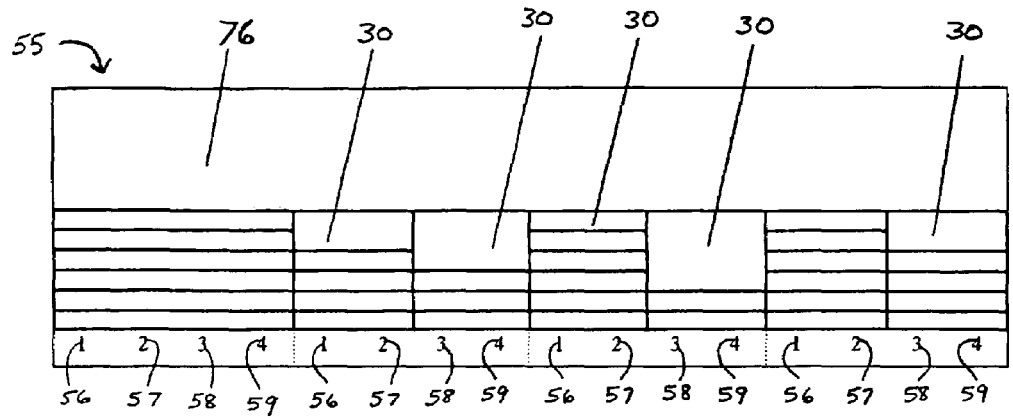
FIG. 3A-C is a perspective view of the color-coded apparatus, called the 'RhythmGuide', used for the placement of playing cubes thereon and the associated method thereof.

FIG. 3A shows a top view of the RhythmGuide 55 to be used for aligning the physical placement of the large playing cube 1 and small playing cubes 2 thereon, having a sequence of numbers (56)(57)(58)(59) labeled "1" "2" "3" "4" respectively, of which is shown repeating four times in FIG. 3A. FIG. 3A also shows five horizontal bars 30 with no color for the purpose described in the next heading section titled, 'How to play the music composition game'. Lastly, FIG. 3A shows one horizontal bar 76 with no color for the purpose of product recognition content.

Figure 3B:
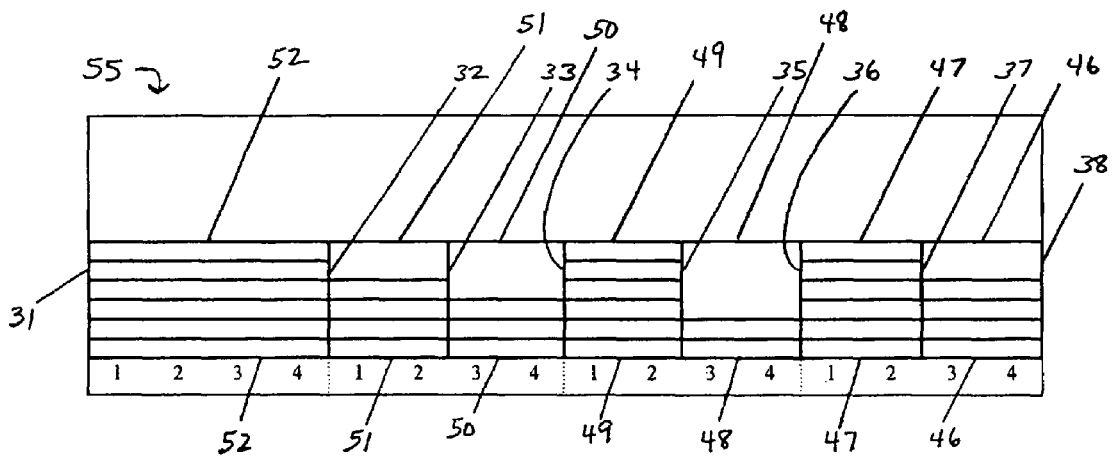

FIG. 3B shows a top view of the Rhythm Guide 55 having vertical boundary lines (31)(32)(33)(34)(35)(36)(37)(38) and having horizontal boundary lines (46)(47)(48)(49)(50) (51)(52) between the previously mentioned vertical boundary lines (31)(32)(33)(34)(35)(36)(37)(38) that intersect for the purpose of outlining the space designated on the RhythmGuide 55 for the placement of playing cubes (1) (2).

Figure 3C:
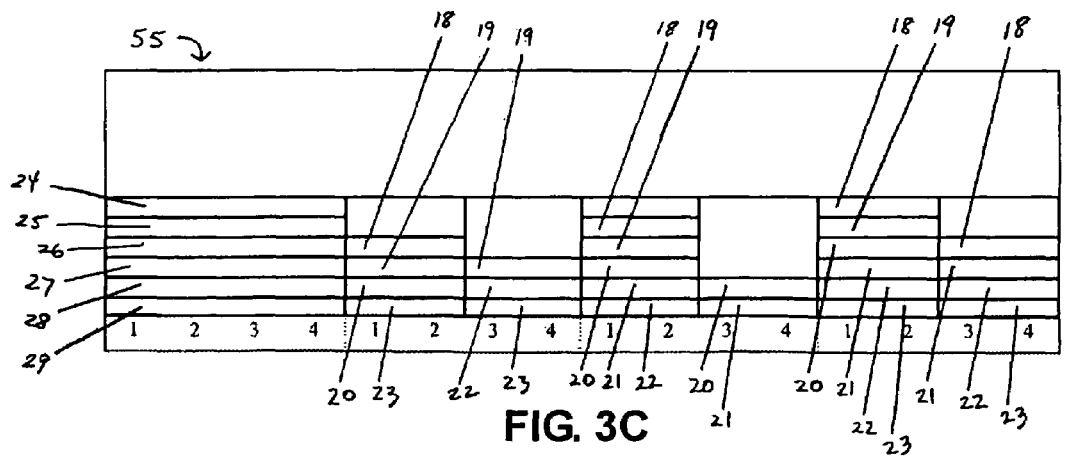

FIG. 3C shows a top view of the Rhythm Guide 55 having twenty-four small horizontal bars (18)(19)(20(21)(22)(23) and six larger horizontal bars (24)(25)(26)(27)(28)(29) used in the music composition method as position markers to indicate where the playing cubes (1)(2) will be placed on the RhythmGuide 55. The yellow color of horizontal bar 18 matches the yellow color of horizontal bar 24. The orange color of horizontal bar 19 matches the orange color of horizontal bar 25. The azure color of horizontal bar 20 matches the azure color of horizontal bar 26. The green color of horizontal bar 21 matches the green color of horizontal bar 27. The purple color of horizontal bar 22 matches the purple color of horizontal bar 28. The crimson color of horizontal bar 23 matches the crimson color of horizontal bar 29.

Figure 4:
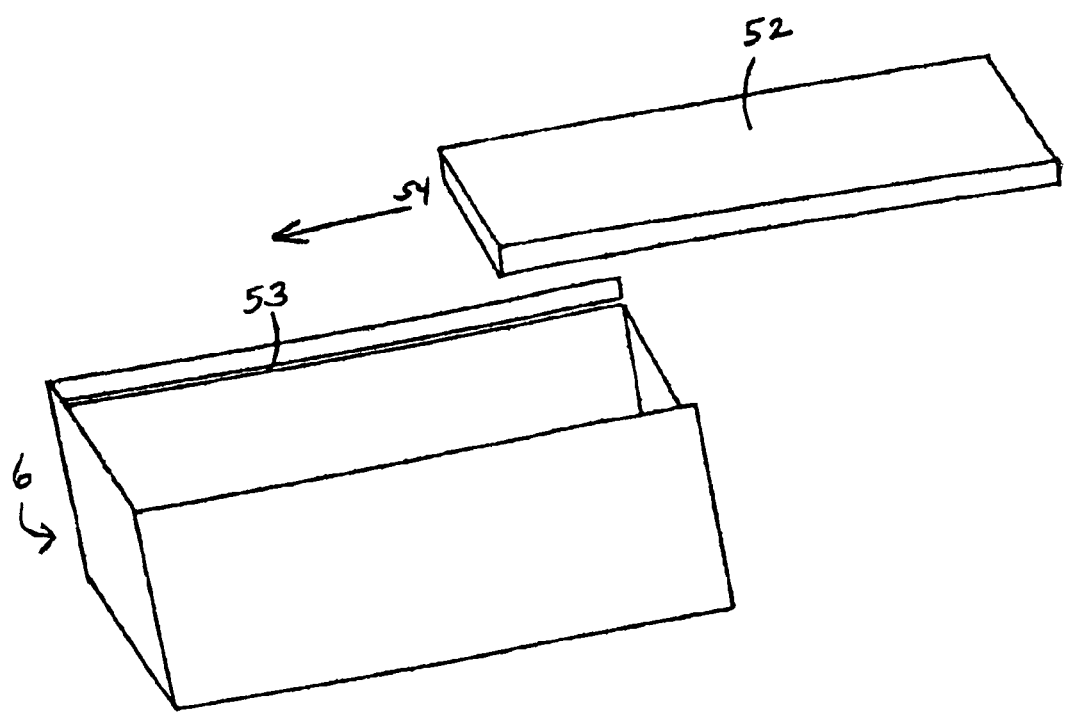
FIG. 4 is a perspective view of a box-shaped container, illustrated with sliding lid open, to hold all twenty-five playing cubes, and RhythmGuide.

FIG. 4 shows a box-shaped container 6 for the purpose of holding the large playing cube 1, twenty-four small playing cubes 2, and the RhythmGuide 55 and having a sliding lid 52. The container can look like a cigar box with a lid 52 that slides into a recessed groove 53 and preferably made of wood of a classic design. The lid 52 slides in the direction of arrow 54 of which is shown in FIG. 4.

How to Play the Music Composition Game

Check the number of playing cubes (1) (2) in the Set before starting to play the game. The Set consists of twenty-four small playing cubes 2 with uniformly-colored letters on the six sides 12 of each cube 2 (four cubes 2 with purple letters, four cubes 2 with yellow letters, four cubes 2 with crimson letters, four cubes 2 with green letters, four cubes 2 with azure letters, four cubes 2 with orange letters) and one large playing cube 1 (having a purple "F" on one side, an orange "D" on one side, a green "G" on one side, a crimson "C" on one side, an azure "A" on one side, and a yellow "E" on one side).

The game can be played by one person but two or more participants are always better; however, this invention does not promote competition between players. This invention is intended to inspire and promote learning and creativity with a musical instrument.

Players decide by whatever method agreed upon who goes first. After player one is selected, player one selects and casts the large playing cube 1 on a convenient flat surface such as a table.

The player will then take in their hand the four small playing cubes 2 that match the color of the musical key 7 cast on the upper horizontal surface of the large playing cube 1.

Then the player casts the four selected cubes 2 on a convenient flat surface such as a table.

Player one will always place the large playing cube 1 on the Rhythm Guide 55 within the boundary lines (52) (31) and (32) of which is shown in FIG. 3B. The large playing cube 1 will obstruct the view of the six horizontal bars (24) (25) (26) (27) (28) (29) shown in FIG. 3C so that the numbers "1" "2" "3" "4", as respectively represented by (56)(57)(58)(59) in FIG. 3A, can be seen by the player.

Player one then takes the cast cubes 2 and places them one at a time within the boundary lines that contain a horizontal bar matching the color of the musical key 7 indicated on the upper horizontal surface of the large playing cube 1 previously cast. For example: if the player cast the musical key 7 labeled "G Major" represented by the green "G" on the side 8 of the large playing cube 1, then the player would select and cast the four small playing cubes 2 with green lettering and place one cube 2 within the space created by boundary lines (49)(34)(35) of which are shown on FIG. 3B, one cube 2 within the space created by boundary lines (48)(35)(36), one cube 2 within the space created by boundary lines (47)(36)(37), and one cube 2 within the space created by boundary lines (46)(37)(38).

The player can randomly select the order in which the cast cubes 2 are placed within the previously mentioned boundary lines.

The numbers (56)(57)(58)(59) shown on FIG. 3A represent the consistent and repeating musical beat for the cast sequence of chords (7)(11) situated on the RhythmGuide 55 that the player is about to play on their instrument.

In the simplest application of the game, the player will play the chords (7)(11) showing on the upper horizontal side of the playing cubes (1)(2) from left to right by playing the chord (7) or (11) on their instrument one time for every number (56)(57)(58)(59) below the large playing cube 1 and one time for every number (56)(57)(58)(59) below the small playing cubes 2 situated on the RhythmGuide 55 beginning with the chord 7 cast on the large playing cube 1.

Whenever a space 30 unoccupied by a cube 2 appears, as shown on FIG. 3A, between cubes 2 or cubes 1 and 2 situated on the RhythmGuide 55, continue playing the cube 1 or 2 to the left of the unoccupied space 30 one time for every number (56)(57)(58)(59) below the unoccupied space 30. For example: if the player cast the green letter of the large playing cube 1 and then selected and cast the four small playing cubes 2 with green letters, the player after arranging the cubes (1)(2) on the Rhythm Guide 55 would form and play the "G" chord 7 shown on the upper horizontal surface of the playing cube 1 with their instrument eight times (four times to correspond with the four numbers (56)(57)(58)(59) located below the large playing cube 1 and four times to correspond with the four numbers (56)(57)(58)(59) located below the two unoccupied spaces 30 created by the boundary lines (51)(32)(33) and (50)(33)(34). Then the player would form and play the chord 11 indicated by the first small playing cube 2 situated on the RhythmGuide 55 to the right of the large playing cube 1 two times with their instrument (one time for each number (56)(57) located below the small playing cube 2 that occupies the space created by boundary lines (49)(34) and (35)). Then the player would form and play the chord 11 indicated by the second small playing cube 2 situated on the RhythmGuide 55 two times with their instrument (one time for each number (58)(59) located below the small playing cube 2 that occupies the space created by boundary lines (48)(35) and (36)). Then the player would form and play the chord 11 indicated by the third small playing cube 2 situated on the RhythmGuide 55 two times with their instrument (one time for each number (56)(57) located below the cube 2 that occupies the space created by boundary lines (47)(36) and (37)). Finally, the player would form and play the chord 11 indicated by the fourth small playing cube 2 situated on the RhythmGuide 55 two times with their instrument (one time for each number (58)(59) located below the small playing cube 2 that occupies the space created by boundary lines (46)(37) and (38)).

At this point in the simplest application of the game, the player can repeat playing the cast sequence of cubes 1 and 2 situated on the Rhythm Guide 55 with their instrument as many times as desired.

The player at any point can arrange and rearrange the small playing cubes 2 previously cast to suit their musical ear and playing mood.

The player can also recast any small playing cube 2 including up to all four paying cubes 2 that correspond to the color-coded key 7 cast on the large playing cube 1 in order to explore other chord 11 combinations on the RhythmGuide 55. When recasting the small playing cubes 2 arranged on the RhythmGuide 55, the player will not recast the large playing cube 1.

The player can continue recasting and rearranging the sequence of small playing cubes 2 on the RhythmGuide 55, repeat playing the cast sequence of chords (7)(11) on the playing cubes (1) (2) with their instrument, or return to the beginning of the music composition method and recast the large playing cube 1.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A musical composition apparatus comprising:
   (a) a first playing cube, said first playing cube having a musical key and an associated color associated with the musical key indicated on the sides thereof and
   (b) a plurality of second playing cubes, each of said second playing cubes having the related chords of a uniformly color coded musical key and a numerical position of the chord within said key indicated on the sides thereof and corresponding to one key and the corresponding color of said key labeled on one side of the first playing cube, and
   (c) a rhythm apparatus, said rhythm apparatus having a color-coded arrangement for placing the first playing cube and the second playing cubes thereon in order to facilitate a random and pre-arranged exploitation of the possible sequences of chord progressions within a musical key.

2. A music composition apparatus as recited in claim 1 wherein the placement of the first playing cube and the second playing cubes on the rhythm apparatus includes a color-coded system of placement indicators that correspond with the color of the first playing cube to indicate where in the progression sequence the first playing cube and the second playing cubes will be physically placed on the rhythm apparatus and for determining the duration for which the musical chords on the first playing cube and the second playing cubes will be played by the musician on their instrument.

3. A music composition apparatus as recited in claim 1 wherein musicians learn how to arrange sequences of related chords into progressions by the first playing cube and the second playing cubes including the chords of a musical key and the corresponding numerical position of said chord within said key.

\* \* \* \* \*